United States Patent [19]

Hardy et al.

[11] Patent Number: 5,222,135

[45] Date of Patent: Jun. 22, 1993

[54] PROCESS FOR THE CONTROL OF THE USE OF A DATA PROCESSING WORK STATION BY A PASSWORD AND DATA PROCESSING WORK STATION USING THIS PROCESS

[75] Inventors: Christian Hardy, Antibes; Gilbert Barillier, Gattieres, both of France

[73] Assignee: Telemecanique, Paris, France

[21] Appl. No.: 812,027

[22] Filed: Dec. 23, 1991

[30] Foreign Application Priority Data

Dec. 27, 1990 [FR] France .................. 90 16320

[51] Int. Cl.⁵ .............................................. H04L 9/00
[52] U.S. Cl. .......................................... 380/4; 380/25
[58] Field of Search ............................ 380/4, 23, 25

[56] References Cited

U.S. PATENT DOCUMENTS

| | | | |
|---|---|---|---|
| 4,959,860 | 9/1990 | Watters et al. | 380/25 |
| 5,022,077 | 6/1991 | Bealkowski et al. | 380/25 |
| 5,060,263 | 10/1991 | Bosen et al. | 380/25 |
| 5,097,506 | 3/1992 | Kaiser, Jr. et al. | 380/25 |
| 5,144,659 | 9/1992 | Jones | 380/25 |

FOREIGN PATENT DOCUMENTS 0268139  5/1988  European Pat. Off. .

OTHER PUBLICATIONS

"Method of Protecting Data on a Personal Computer", *IBM Technical Disclosure Bulletin*, vol. 28, No. 6, Nov. 1985, p. 2530.

*Primary Examiner*—David Cain
*Attorney, Agent, or Firm*—Young & Thompson

[57] ABSTRACT

Method for controlling the use of a data-processing workstation (1) by password, comprising storage of the password within the workstation and, at each initialization of this latter, acquisition of a password proposition followed by a comparison of this proposition with the stored password. The password is stored in a controlled-erasure permanent memory unit. In order to release the workstation (1) in the event of loss of the password, provision is made for generation (D1) of a set (36) of data associated with the blocked workstation, communication (D2) of part of these data by the user to an authorized service (S), supply (D3) in return by this service of coded release data (43), acquisition (D4) of these latter by the user on the workstation, thereby resulting, in the event of compliance, in erasure of the initial password and in release of the workstation. Application in an industrial environment to control of the use of offline or network workstations.

12 Claims, 1 Drawing Sheet

PROCESS FOR THE CONTROL OF THE USE OF A DATA PROCESSING WORK STATION BY A PASSWORD AND DATA PROCESSING WORK STATION USING THIS PROCESS

The present invention relates to a method for controlling the use of a data-processing workstation by password. It also applies to a data-processing workstation which carries out this method.

The considerable development of professional software programs, in particular software programs employed in a network architecture environment, has inevitably given rise to problems of security and control of access to data-processing workstations and problems of control of the use of accessible software programs in a network.

Methods already exist for the purpose of controlling the use of a data-processing workstation by having recourse to a mechanical key and/or the presentation of a password by the user. Other methods resort to the reading of a built-in microprocessor card held by authorized users at a predetermined data-processing workstation. These methods call for the use of a card reader coupled to the workstation, which is a costly and complex device.

In present-day microcomputers with password-protected access, in particular the PC-type compatible microcomputers, the password is encrypted and stored in a CMOS-technology permanent RAM memory continuously supplied from a battery. This password is requested at the time of each initialization of the microcomputer prior to execution of the auto-execution program commonly referred-to as a "boot". These methods of control in which the password is stored in a battery-powered memory have a major disadvantage in that they can be circumvented by erasing the content of this memory. Erasure can be obtained by opening the casing of the central unit of the microcomputer, by gaining access to the permanent RAM memory, and by disconnecting the power supply battery or by short-circuiting the supply terminals of the RAM memory if these latter are not protected by a diode. This operation is performed either by an authorized user who has forgotten the password associated with the workstation which he desires to use and decides to erase this forgotten password in order to actually gain free access to this workstation, or by an unauthorized third party for abusive purposes or for illicit duplication of software packages. On completion of such an operation which is relatively simple but can last at least twenty minutes or so in order to obtain erasure of the content of the RAM memory if short-circuiting is not possible, the password is erased and it is then only necessary to re-connect the battery. The microcomputer can then be re-started at the expense, however, of re-writing of the configuration which has inevitably been erased at the same time as the initial password.

Manufacturers of microcomputers have of course taken steps to prevent access to the interior of the microcomputer by placing a mechanical lock which makes it possible to lock the casing containing the central unit. Two keys are usually supplied to the authorized user of the data-processing workstation.

However, the possible loss of the keys by the user and the possibility of violating mechanical locks of this type with fairly great ease make this type of password control relatively ineffective and a cause of constraints for an authorized user. It is therefore necessary to provide the latter with a method of control which, in the event that the password should have been forgotten or lost, enables the user to gain further access to his workstation without any need to take action within the interior of the workstation.

The object of the present invention is to overcome these disadvantages by proposing a method for controlling the use of a data-processing workstation by password, comprising a step of storage of a password within the workstation and, at each initialization, a step of acquisition of a password proposition emitted by a potential user of the workstation followed by a step of comparison of said proposition with the initially stored password which leads either to a step of permission to use the workstation in the event of successful comparison or to a step of blocking of the workstation when the above-mentioned acquisition and comparison steps have been performed a predetermined number of times.

In accordance with the invention, the method of control is characterized in that, during the storage step, the password is stored in a controlled-erasure permanent memory unit, in particular of the electrically erasable EEPROM type, and that it involves in addition a workstation release step involving generation by the workstation of a set of data associated with the blocked workstation, communication of part of said data by the user to an authorized service, supply in return of coded release data by said authorized service and acquisition of said coded release data by the user on the workstation, thereby resulting, in the event of compliance, in erasure of the initial password and in release of the workstation.

Thus, with the method in accordance with the invention, it is no longer possible to carry out a manual operation of erasing of the password of a blocked workstation and its release is subjected to an exchange of information between the user and an authorized service, for example the manufacturer of the workstation or an approved distributor. This exchange of information guarantees identification of anyone who requests a release operation and ensures that the person who is legitimately in charge of the workstation has the possibility of using it again without any need for internal action.

In addition, the use of an EEPROM-type memory makes erasing of the password a particularly complex operation since this erasing operation cannot be performed simply by short-circuiting the supply as is in fact the case with battery-powered CMOS-type RAM memories but requires the generation of a programming signal having a predetermined voltage level.

In a preferred version of the invention, the step of acquisition of a password proposition is carried out during an automatic execution step undertaken in response to a data-processing workstation initialization order.

Thus the control of the use of the workstation is carried out each time it is turned-on, even before the user can gain access to any functionality offered by or via the terminal. This acquisition step is therefore an integral part of the autotest procedure normally carried out within a microcomputer under the control of its BIOS basic input/output system.

According to another aspect of the invention, the data-processing workstation which carries out the method in accordance with the invention and comprises within a casing a control and processing unit, at least one memory unit which is accessible solely for reading and is especially of the ROM type, means for storage on a magnetic medium and especially a hard disk, visual display and acquisition means consisting in particular of a keyboard, said means for storage on a magnetic medium being intended to contain the system for operation of the workstation and the memory unit being intended to contain the basic input/output system of the workstation, is characterized in that it comprises in addition a controlled-erasure permanent memory unit, especially of the electrically-erasable EEPROM type, connected to the control and processing unit, this controlled-erasure permanent memory being so arranged as to contain a password for controlling the use of the workstation and that the basic input/output system is adapted to initiate, at the time of an initialization of the workstation by a user, the display on the visual display means of an autotest screen-page comprising a password-entry request and, in the event of non-presentation of said password, the display of a blocking screen-page which presents data associated with the blocked workstation and a request for entry of a release code.

Other particular features and advantages of the invention will also become apparent in the description given hereinafter. In the accompanying drawings which are given by way of non-limitative example:

There will now be described a particular form of execution of the method of control in accordance with the invention at the same time as a data-processing workstation to which this method is applied.

Figure 1:
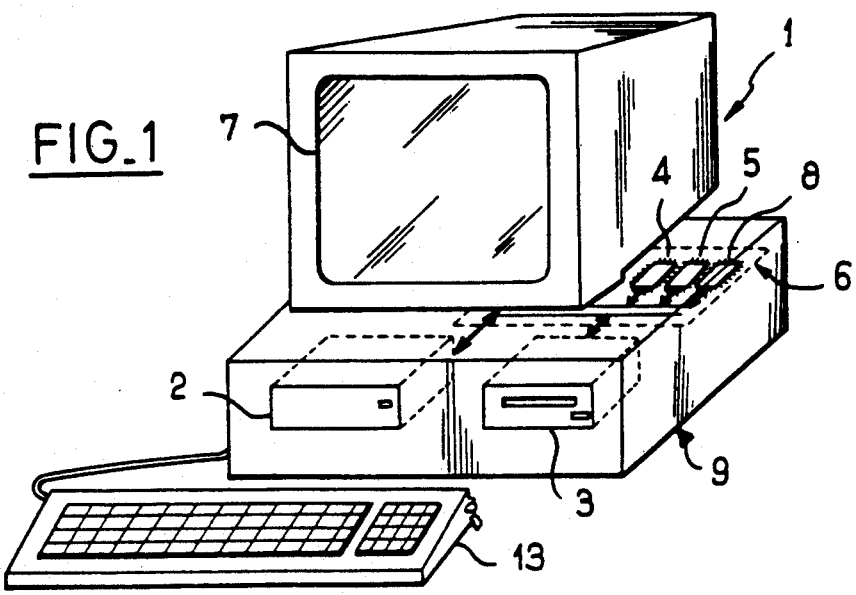
FIG. 1 is a simplified illustration of a data-processing workstation which carries out the method in accordance with the invention.

Reference being made to FIG. 1, consideration is given to a data-processing workstation, for example a microcomputer 1 of the compatible PC or PS type, on which an authorized user processes one or a number of software programs in a single-station mode or within a network of workstations. The microcomputer 1 usually has a casing 9 containing in particular a mother-board 6, and units for storage on a magnetic medium, for example a hard disk 2 and a floppy-disk reader 3 which are connected to the mother-board 6, a monitor provided with a display screen 7 and a keyboard 13 which permits in particular the acquisition of data and orders.

The mother-board 6 essentially includes a microprocessor 4 which carries out the functions of control and processing and the power of which determines the performances of the workstation 1 and a permanent memory 5 which is accessible solely for reading, especially of the ROM type, in which is written the basic input/output system of the microcomputer commonly designated as BIOS, and which ensures execution of a sequence of autotest and initialization in response to an initialization order undertaken, either by turning on the microcomputer or by specific action by the user on the keyboard.

The mother-board 6 also includes a permanent memory 8 which provides controlled erasing, for example an electrical-erasure memory of the EEPROM type (programmable memory which can be accessed solely for reading and is electrically erasable) which is intended in accordance with the invention to store the password of the microcomputer, preferably in encrypted form. In an effective form of construction, the EEPROM memory 8 has a capacity of 16 words of 16 bits and communicates with the microprocessor 4.

Figure 2:
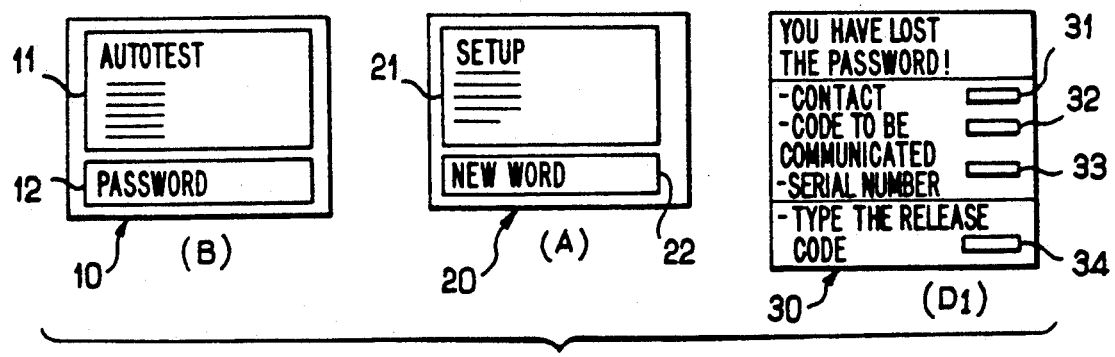
FIG. 2 illustrates schematically the three screen-pages for autotest, configuration and blocking which are employed in the method according to the invention.

The different phases of the method of control in accordance with the invention will now be described with reference to the screen-pages illustrated in FIG. 2.

At the time of turn-on of re-initialization of the microcomputer 1, an autotest screen-page 10 appears on the screen 7 as a result of the performance of an initialization program contained in the BIOS basic input/output system. In addition to the items of information 11 at the workstation, there appears in this screen-page 10 a request 12 for entry of a password proposition. The workstation user then types on the keyboard 13 the password which he holds. The microcomputer 1 records these keystrokes in a semi-blind mode and displays a graphic character on completion of each keystroke in order to enable the user to follow the number of characters typed. This constitutes part of the acquisition step B.

It should be noted that, if no password has previously been defined and stored, no password entry request is made at the time of initialization of the microcomputer and it is therefore free for use.

If a password is in fact stored in the EEPROM memory 8, the user is permitted to carry out three acquisition tests. Should they prove unsuccessful, the microcomputer is then blocked (step D1) and a blocking screen-page 30 is generated. On completion of each acquisition step B, a comparison step C is carried out between the password proposition entered by the user and the password actually stored in the EEPROM memory 8. The passwords are preferably encrypted in accordance with an encryption algorithm of the type currently employed in the field of control of access to protected information. If the password proposed by the user corresponds to the stored password, a step D of permission to use the workstation is undertaken: the autotest screen-page 10 disappears in order to be replaced either by the welcome pages of a software package preferably associated with the workstation concerned or by the usual orders of the processing system.

During a session of utilization of the data-processing workstation 1, the user has the possibility either of introducing a new password or of modifying the existing password by initiating a password storage step A. To this end, the user must request the operation of a SETUP configuration utility software program which is provided in the majority of present-day computers but which has been modified to meet the requirements of the invention. This utility software program is in fact adapted so as to propose to the user an option for entry of a new password. This is realized by the presence, within a configuration screen-page 20, of an invitation 22 to enter a new password next to items of information and orders 21 which are specific to the SETUP utility software program. This latter can be stored in executable form either in the permanent memory 5 of the microcomputer or within the DOS operating system in the hard disk 2.

In the event of blocking D1 of the microcomputer 1 as a result of several unsuccessful attempts to enter a password, for example more than three attempts, a blocking screen-page 30 is displayed. This blocking screen-page 30 comprises, in addition to a message informing the user that blocking of the workstation has taken place as a result of loss of the password, a number of data associated with the blocked workstation including the serial number 33 of the workstation 1, a random code 32 which depends neither on the hour nor on any other parameter which can be controlled by the user, and the coordinates 31, especially telephone coordinates, which provide the authorized service with access to release of the workstation concerned. The blocking screen-page 30 comprises in addition a message inviting the user to enter via the keyboard 13 a release code 34 which will be supplied to him by the authorized service in exchange for the serial number 33 and the random code 32 which must be communicated to this service by the user.

Figure 3:
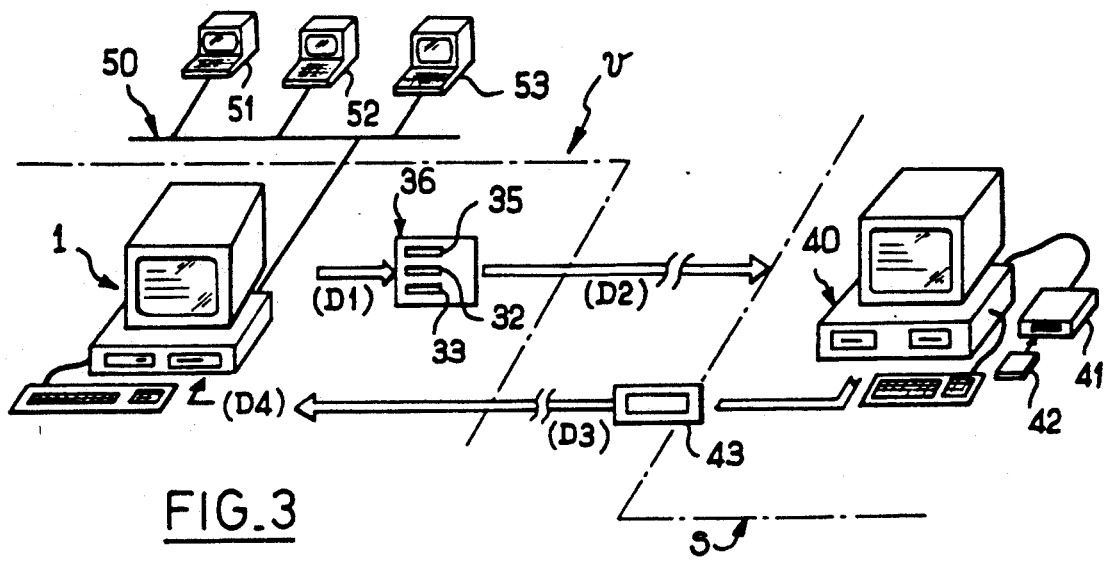
FIG. 3 is a synoptic view of a mode of execution of the releasing steps performed with the method in accordance with the invention.

Reference being made to FIG. 3, there will now be described the different phases of step D for releasing the workstation 1. In more general terms, it is considered that the blocked workstation 1 is connected in a network 50 to other data-processing workstations 51, 52, 53 which may also be endowed with the same method of control in accordance with the invention. The generation D1 of the blocking screen-page has supplied the user with the random code 32 to be communicated and the serial number 33 of the workstation concerned. The user transmits from his work site U to the authorized service S a set of data comprising the random code 32, the serial number 33 and his coordinates 35, for example his name, the corporate name of his firm, or a telephone number for subsequent re-call. This communication step D2 can be performed by telephone, facsimile transmission, telex or any other available communication means.

The authorized service S is equipped with a microcomputer 40 or any other equivalent control and processing unit on which is installed a release utility package, access to this latter being governed by the presentation of associated utilization rights. By way of example, the microcomputer 40 can be equipped with a key support 41 which can receive one or a number of key modules 42 containing utilization rights. A device of this type is described, for example, in French patent Applications 90 06112 and 90 06113 of May 16th, 1990 in the name of the present Applicant.

An operator of the authorized service S enters the data communicated by the user and requested by the release software. On the basis of the communicated data, this latter computes a release code 43 in accordance with a particular algorithm. After supply D3 of the release code 43 in return to the user, the latter acquires the release code during an acquisition step D4 whilst the blocking screen-page 30 is still present on the screen. The software program associated with the release step D is included in the permanent memory 5 within the BIOS basic input/output system. This software program compares (if necessary after encryption) the acquired release code 43 with a reference code which is computed locally at the level of the blocked workstation on the basis of serial number and random code data and which is inaccessible to the user. If the release code is compliant, the workstation 1 is in fact released and the blocking screen-page 30 disappears in order to be replaced either by the welcome pages of the application package which is preferably associated with the workstation 1 or by writing of operating system orders by the user. Release of the workstation 1 is performed by erasing the password which is present within the EEPROM memory 8. Non-compliance of an acquired release code has the effect of keeping the workstation in a blocked situation.

It must be noted in addition that the passwords are preferably encrypted within the data-processing workstation 1 in accordance with a predetermined encryption algorithm before being stored in the EEPROM memory 8. The algorithm is contained in executable form in the permanent memory 5 which contains the BIOS system.

The present invention is of course not limited to the examples which have just been described and many alterations can be made in these examples without departing from the scope of the invention.

Thus the method in accordance with the invention can be applied to many types of workstations, whether they are fixed or portable, off-line or within a network which can be single or multiple. Furthermore, depending on future advances made in integrated-circuit technology, consideration can be given to types of permanent memory other than the electrically-erasable memory employed in the example described. Finally, it is possible to conceive any arrangement of the screen-pages of the method is regard to the language employed, the characters, colors, and codes chosen for the design of these screen-pages.

We claim:

1. Method for controlling the use of a data-processing workstation (1) by password, comprising a step (A) of storage of a password within the workstation (1) and, at each initialization of this latter, a step (B) of acquisition of a password proposition emitted by a potential user of said workstation (1) followed by a step (C) of comparison of said proposition with the initially stored password which leads either to a step (D) of permission to use the workstation (1) in the event of successful comparison or to a step of blocking of the workstation (1) which the above-mentioned acquisition and comparison steps (B) and (C) have been performed a predetermined number of times, characterized in that:

during the storage step (A), the password is stored in a controlled-erasure permanent memory unit (5),
provision is made in addition for a step (D) for releasing the workstation (1), involving generation (D1) by the workstation (1) of a set of data (31, 32, 33) associated with the blocked workstation (1), communication (D2) of part (32, 33) of said data by the user to an authorized service (S), supply (D3) in return by said authorized service of coded release data (43) and acquisition of said coded release data (43) by the user on the workstation (1), thereby resulting, in the event of compliance, in erasure of the initial password and in release of the workstation (1).

2. Method in accordance with claim 1, characterized in that the acquisition step (B) is carried out during an automatic execution step undertaken in response to an order for initialization of the data-processing workstation (1).

3. Method in accordance with claim 1 or claim 2, characterized in that the initial step (A) of storage of a password is carried out during execution of a configuration utility program (SETUP).

4. Method in accordance with claim 1 characterized in that the set of data associated with the blocked workstation (1) comprises a random code (32) and a serial number (33) of the data-processing workstation (1).

5. Method in accordance with claim 1 characterized in that the password of the data-processing workstation (1) can be modified at any moment during a normal work session by execution of a password modification step included in the configuration utility program (SETUP) as a result of a reintroduction of the password to be modified.

6. Method in accordance with claim 1, characterized in that the coded release data (43) are generated from data (36) communicated by the user by execution of a protected release software program installed on control and processing means (40), execution of said protected release program being governed by the presentation of utilization rights associated with said software program.

7. Method in accordance with claim 1 characterized in that the data associated with the blocked workstation also comprise coordinates for contacting the authorized service (S).

8. Data-processing workstation (1) which carries out the method in accordance with claim 1 and comprises within a casing (9) a control and processing unit (4), at least one memory unit (5) which is accessible solely for reading, local means or means accessible via a network for storage, visual display means (7) and acquisition means (13), said means for storage on a magnetic medium (2, 3) being intended to contain the operating system (DOS) of the workstation (1), and the permanent memory unit (5) being intended to contain the basic input/output system (BIOS) of the workstation (1), characterized in that it comprises in addition a controlled-erasure permanent memory unit (8) connected to the control and processing unit (4), this controlled-erasure permanent memory unit (8) being so arranged as to contain a password for controlling the use of the workstation (1) and that the basic input/output system (BIOS) is adapted to initiate, at the time of an initialization of the workstation (1) by a user, the display on the visual display means (7) of an autotest screen-page (20) comprising a password-entry request and, in the event of non-compliance of the typed password, the display of a blocking screen-page (30) which presents data (31, 32, 33) associated with the blocked workstation and a request for entry of a release code (34).

9. Data-processing workstation (1) in accordance with claim 8 and equipped with a configuration utility software program (SETUP), characterized in that this configuration utility software program (SETUP) is adapted to control the display or the means (7) for display of a configuration screen-page (20) comprising a request for entry of a new password by the user of the data-processing workstation (1) and to encrypt said new password in accordance with a predetermined encryption algorithm and to store it in the controlled-erasure permanent memory unit (8).

10. Data-processing workstation (1) in accordance with claim 9, characterized in that the adapted configuration utility software program (SETUP) is stored in executable form in the permanent memory unit (5).

11. Data-processing workstation in accordance with claim 9, characterized in that the adapted configuration utility software program (SETUP) is stored in executable form by the operating system in a local or distant storage unit.

12. Data-processing workstation (1) in accordance with claim 1, characterized in that the basic input/output system (BIOS) is so arranged as to encrypt in accordance with a predetermined encryption algorithm a password proposition entered from acquisition means (13) by the user and to compare said encrypted proposition with the encrypted password stored in the controlled-erasure permanent memory unit (5).

* * * * *